T. DAVIS.
MULTIPLE TOOL HOLDER.
APPLICATION FILED APR. 28, 1914.
1,113,882.
Patented Oct. 13, 1914.
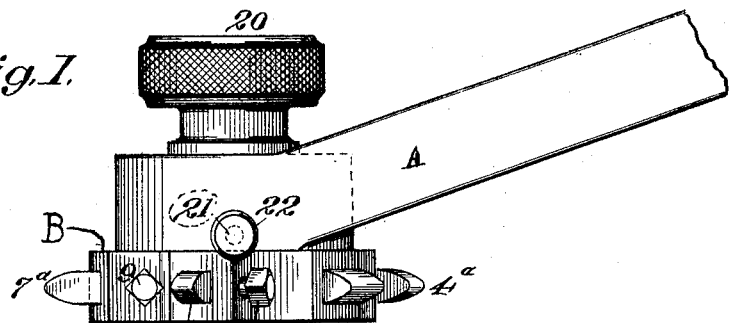
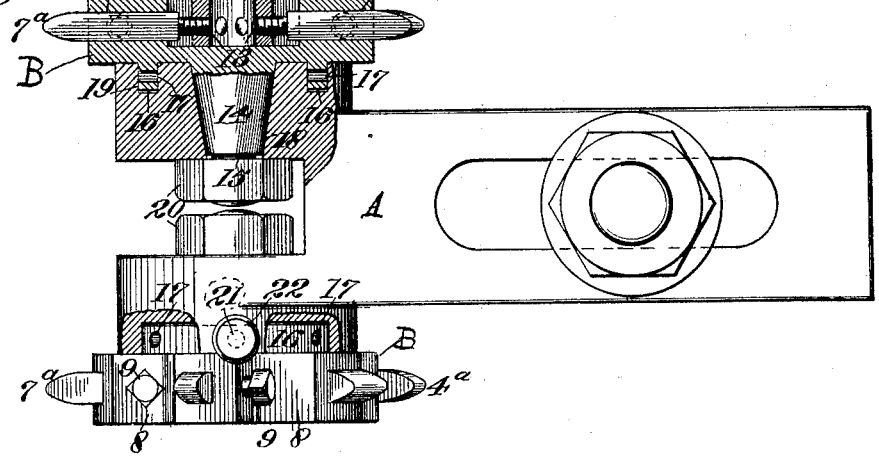
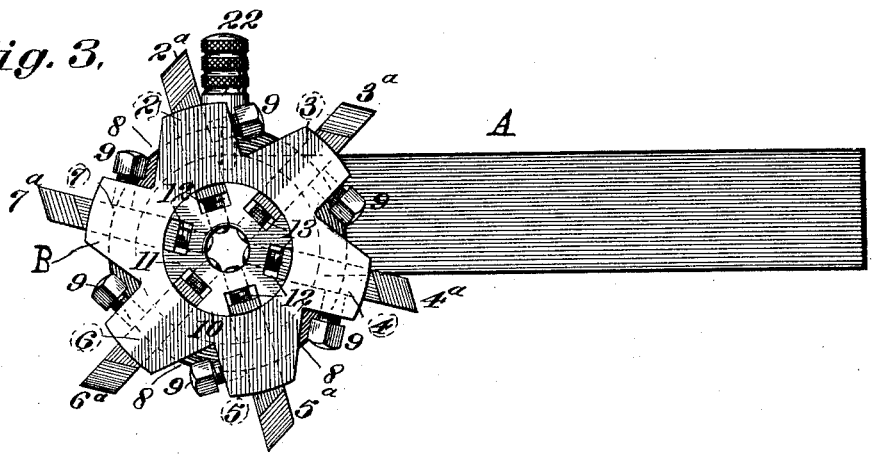
WITNESSES:
Charles Pickles
Thos Tashberg
INVENTOR
Trayharn Davis.
BY G. H. Strong.
ATTORNEY

UNITED STATES PATENT OFFICE.

TRAYHARN DAVIS, OF OAKLAND, CALIFORNIA.

MULTIPLE-TOOL HOLDER.

1,113,882. Specification of Letters Patent. Patented Oct. 13, 1914.

Application filed April 28, 1914. Serial No. 834,947.

*To all whom it may concern:*

Be it known that I, TRAYHARN DAVIS, machinist, a citizen of the United States, residing at Oakland, in the county of Alameda and State of California, have invented new and useful Improvements in Multiple-Tool Holders, of which the following is a specification.

This invention relates to a multiple tool holder which is particularly constructed for lathes.

It is one of the objects of the present invention to provide a simple, substantial, easily operated tool holder which is so constructed that a multiple set of tools such as are commonly used in a lathe may be supported and operated as a single unit, thus permitting the finishing of an article without once removing it from the centering spindles in the lathe.

Another object is to provide a novel means for bringing and holding the tool required into cutting position, and to provide means for adjusting the position of each individual tool.

Further objects will hereinafter appear.

The invention consists of the parts and the construction and combination of parts as hereinafter more fully described and claimed, having reference to the accompanying drawings, in which—

Figure 1 is a plan view of a single multiple tool holder. Fig. 2 is a plan view of a double multiple tool holder partly in section. Fig. 3 is a side elevation of same.

Referring to the drawings, A indicates the holder and B the multiple tool head. The holder proper may be either constructed as a single holder, as indicated in Fig. 1, or as a double holder, as indicated in Fig. 2. The multiple tool head, referring to Figs. 2 and 3, is substantially circular in shape and is radially slotted, as at 2, 3, 4, 5, 6 and 7, to receive various kinds and shapes of tools, as indicated at 2ª, 3ª, 4ª, 5ª, 6ª and 7ª. The outer periphery of the tool head is preferably notched, as at 8, to provide seats for the set-screws 9 by which each individual tool is secured in position. One side of the multiple tool head is provided with a central recess 10, with which the radial tool slots communicate. Supported within said recess is a secondary holder 11 which is also slotted, as indicated at 12, to permit each individual tool to project into the secondary holder 11. Mounted in the bottom of the slot is a set-screw 13. These set-screws are provided for the purpose of adjusting the position of each individual tool; in other words, an adjustable stop is provided in the bottom of each slot against which the individual tools are supported. Projecting from the other side of the multiple tool head is a tapered shank 14, the outer end of which is threaded, as at 15, and surrounding said shank and formed integral with the head is an annular flange projection 16 which is radially perforated, as at 17, the number of perforations corresponding to the number of tools used.

The outer end of holder B is provided with a conical-shaped opening 18 which is adapted to receive the shank 14 and is similarly provided with an annular recess or groove 19 into which flange 16 may project; a suitable form of nut 20 being provided for the purpose of securing shank 14, with connected tool head, in position. Communicating with the annular groove 19 is a radially disposed perforation 21 through which a pin 22 may be inserted for the purpose of locking the tool head against peripheral movement.

In actual operation, after having finished a cut with a certain tool, and when it is desired to move a second tool into operative position, it is only necessary to slacken up on nut 20. The pin 22 is then removed and the tool head is thus free to be turned until the required tool has been turned into position; the exact position being secured when the corresponding perforation 17 is brought into register with the perforation 21. Pin 22 is then inserted and the nut 20 again tightened. The correct position of the cutting tool, with relation to the work, is thus always secured, and the tool is furthermore solidly clamped and held in position both by the pin 22 and the nut 20.

The double tool holder may be used to great advantage as two cuts can be taken at one time. The double tool holder also provides a more substantial support, as the holder B must necessarily be heavier in construction than where a single tool head is used. The single tool holder may sometimes be used to advantage over a double tool holder as the other end of same may be angularly disposed, as indicated in Fig. 1, thus permitting the tool to be brought on a direct line with the center of the holder. The construction is otherwise substantially similar.

A single or double multiple tool holder constructed as here shown is particularly useful where several cuts and several tools are required, as it permits the article to be finished without removing it from the centering spindles of the lathe, and, furthermore, it eliminates the necessity of changing or setting up tools, as each individual tool in the tool head is set for the required cut. A tool head may thus be set up for a certain job and another tool head may be applied when other work is to be accomplished. A multiple tool holder of this nature can furthermore be used to great advantage where the lathe is provided with an automatic stop.

The materials and finish of the several parts of the device are such as the experience and judgment of the manufacturer may dictate.

I wish it understood that various changes in form, proportions and minor details of construction may be resorted to within the scope of the appended claims, and that I do not wish to limit myself to the specific design and construction here shown.

Having thus described my invention, what I claim and desire to secure by Letters Patent is—

1. In a multiple tool holder, the combination of a holder having an enlargement formed on its outer end with an annular groove cut in the face thereof, a circular tool head carried by the enlarged end of the holder and turnable therein, a plurality of radially disposed tools secured in the tool head, an annular flange formed on the inner face of the tool head and adapted to project into the annular groove on the holder, said flange having a plurality of perforations extending therethrough, one perforation opposite each tool, a pin insertible through the holder and any of said perforations to lock any selected tool in position, slots formed in the tool head in which the tools are mounted, means for securing the tools in their respective slots, a secondary holder centrally mounted in the tool head, and a plurality of set-screws carried by the secondary holder to form an adjustable stop for each tool.

2. In a multiple tool holder, the combination of a holder, a tool head having a plurality of radially disposed slots formed therein turnably mounted on the holder, means for locking the head against turning movement, a tool in each slot, a secondary holder centrally mounted in the tool head having slots formed therein into which the inner end of each tool is adapted to project, and a plurality of set-screws carried by the secondary holder, one for each slot.

3. In a multiple tool holder, the combination of a holder, a tool head having a plurality of radially disposed slots formed therein turnably mounted on the holder, means for locking the head against turning movement, a tool in each slot, a secondary holder centrally mounted in the tool head having slots formed therein into which the inner end of each tool is adapted to project, a plurality of set-screws carried by the secondary holder, one for each slot, and means on the head for locking each tool.

In testimony whereof I have hereunto set my hand in the presence of two subscribing witnesses.

TRAYHARN DAVIS.

Witnesses:
  JOHN A. DAVIS,
  WILLIAM C. FLETCHER.

Copies of this patent may be obtained for five cents each, by addressing the "Commissioner of Patents, Washington, D. C."